(12) United States Patent
Caruso

(10) Patent No.: US 10,844,845 B2
(45) Date of Patent: Nov. 24, 2020

(54) SELF-SUPPORTING NACELLE STRUCTURE FOR WIND TURBINES

(71) Applicant: Seawind Ocean Technology IP B.V., Amsterdam (NL)

(72) Inventor: Silvestro Caruso, Genoa (IT)

( * ) Notice: Subject to any disclaimer, the term of this patent is extended or adjusted under 35 U.S.C. 154(b) by 0 days.

(21) Appl. No.: 16/325,257

(22) PCT Filed: Aug. 23, 2017

(86) PCT No.: PCT/IB2017/001057
§ 371 (c)(1),
(2) Date: Feb. 13, 2019

(87) PCT Pub. No.: WO2018/037276
PCT Pub. Date: Mar. 1, 2018

(65) Prior Publication Data
US 2019/0186471 A1     Jun. 20, 2019

(30) Foreign Application Priority Data

Aug. 26, 2016 (IT) .................... 102016000087635

(51) Int. Cl.
*F03D 80/80* (2016.01)
*F03D 80/00* (2016.01)

(52) U.S. Cl.
CPC ............ *F03D 80/80* (2016.05); *F03D 80/00* (2016.05); *F05B 2230/232* (2013.01); *F05B 2240/14* (2013.01); *F05B 2250/231* (2013.01); *Y02E 10/72* (2013.01); *Y02P 70/50* (2015.11)

(58) Field of Classification Search
CPC ........ F03D 80/80; F03D 80/00; Y02P 70/523; F05B 2230/232; F05B 2240/14; F05B 2250/231; Y02E 10/726
See application file for complete search history.

(56) References Cited

U.S. PATENT DOCUMENTS 9,121,308 B2 *    9/2015   Siegfriedsen   ............ F01D 25/28

FOREIGN PATENT DOCUMENTS

| EP | 1860322 A2 * | 11/2007 | ............. F03D 80/80 |
| EP | 1860322 A2 | 11/2007 | |
| EP | 2314865 A1 | 4/2011 | |
| WO | 2012107049 A1 | 8/2012 | |

(Continued)

*Primary Examiner* — Tulsidas C Patel
*Assistant Examiner* — Joseph Ortega
(74) *Attorney, Agent, or Firm* — Themis Law

(57) ABSTRACT

A self-supporting nacelle structure for wind turbines, adapted to house a transmission assembly, includes a first shaft connected to a wind turbine rotor hub and to a gearbox, and a second shaft connected to the gearbox and to a generator. The nacelle structure further includes a tubular outer shell defining delimiting a space for housing the transmission assembly, a vertical tubular extension with an upper end edge connected to the outer shell and a lower end edge secured to a tower, an inner frame secured to the outer shell and having a plurality of transverse ribs and a plurality of longitudinal ribs joining the transverse ribs, each transverse rib extending in a closed path, completely enclosing the transmission assembly. The outer shell has a portion with a closed cross section, with at least one transverse rib secured thereto to provide the structure with high torsional and flexural stiffness.

12 Claims, 4 Drawing Sheets

(56) References Cited

FOREIGN PATENT DOCUMENTS

| | | | | |
|---|---|---|---|---|
| WO | 2012150502 A1 | 11/2012 | | |
| WO | WO-2012150502 A1 * | 11/2012 | ................ | E01F 3/00 |
| WO | 2014173808 A1 | 10/2014 | | |
| WO | WO-2014173808 A1 * | 10/2014 | ............. | F03D 15/20 |

* cited by examiner

SELF-SUPPORTING NACELLE STRUCTURE FOR WIND TURBINES

The present invention addresses the field of power generation from renewable sources and relates to a nacelle structure for wind turbines, particularly for wind turbines having an indirectly driven generator.

The main power generation systems that use a wind turbine are known to comprise a rotor having one or more blades and a hub for connecting such rotor to a transmission assembly comprising a power generator.

The transmission assembly, usually known as drive train, may be configured to directly drive the generator, without using gearbox means, interposed between the rotor and the generator.

Alternatively, the transmission assembly may comprise a gearbox element, for driving the generator at a speed higher than the speed of the rotor.

Particularly, in indirect systems, the transmission assembly comprises a first shaft connected to the rotor hub and the input of the gearbox respectively, and a second shaft connected to the output of the gearbox and the generator.

In indirect systems, the rotation speed of the first shaft is lower than that of the second shaft, whereby the first shaft is usually designated as a "slow shaft" and the second shaft is generally designated as a "fast shaft".

In wind turbines, the transmission assembly is housed in a nacelle consisting of a load-bearing metal base and a light cover.

The slow shaft is generally supported by one or more bearings accommodated in supports that are stably secured to the base. On the other hand, the gearbox may be secured in overhanging fashion to the rear end of the slow shaft.

Here, the torque transferred to the gearbox during operation is counteracted by one or more arms secured to the base and attached to the gearbox case.

The rear bearing of the slow shaft may be also integrated in the gearbox and the gearbox case is connected to the base via special arms.

In an alternative configuration, the slow shaft does not support the gearbox, and the latter is directly secured to the base and may be connected to the slow shaft via a flexible or jaw coupling.

The gearbox is a particularly delicate part, exposed to failure or malfunctioning when subjected to lateral forces and moments or cyclic displacements from its installation position.

Nevertheless, in operation the rotor may transfer stationary side loads and cyclic loads via the slow shaft, which may shorten the life of the gearbox due to fatigue.

The base may be also exposed to the action of the loads generated by the rotor and transferred via the bearings of the shaft, and be thus subjected to bending and/or twisting of its structure, leading, in operation, to deformations and displacements of the gearbox supports or the other parts of the transmission assembly from their installation position.

When the gearbox is mounted to the base, the displacements of the rear end of the slow shaft may cause drawbacks at the first stage of the gearbox.

Nevertheless, even when the gearbox is supported by the slow shaft, the displacements of the base cause dynamic oscillations of the case which adversely affect its operation and the duration of the gearbox stages.

In this type of nacelles, the metal base in use has a predetermined cross section, may be open or closed but has a reduced height.

The main drawback of the nacelles that use this type of base is that they do not have enough structural stiffness to keep the supports of the transmission assembly still.

The relative flexibility of these bases exposes the parts of the transmission assembly, and particularly the gearbox, to displacements and oscillations that cause failure and malfunctioning.

This type of bases cannot minimize the bending and twisting displacements of the structure, due to the aerodynamic loads of the rotor.

A further drawback of these nacelles is that the installation of high-power wind turbines requires a large base that considerably increases the overall weight of the nacelle.

Another non-negligible aspect is that the cover of this type of nacelles is made of relatively light materials, typically glass fibers or the like.

These covers are less adapted to support the strong stresses generated by the wind in case of particularly adverse weather conditions, such as a hurricane.

Furthermore, these types of covers are not strong enough and cannot support auxiliary parts, such as the cooling means for the parts of the transmission assembly and especially cannot provide a landing surface on the nacelle roof for receiving helicopters for use in transporting materials and personnel during maintenance.

The present invention has been conceived to obviate the above described technical problems, by providing a nacelle structure for wind turbines that has a high general and local structural stiffness.

A further object of the present invention is to provide a nacelle structure for wind turbines that can stably accommodate the transmission assembly, thereby minimizing displacements and stresses that may act thereupon due to external loads.

Also, a further object of the present invention is to provide a nacelle structure for wind turbines that has high strength and wind resistance.

A further object of the present invention is to provide a nacelle structure for wind turbines that has a rigid, self-supporting enclosure, which can also support parts located outside the nacelle, and withstand the weight and dynamic action of a helicopter landing on the roof of the structure.

Another object of the present invention is to provide a nacelle structure for wind turbines that has a considerably lower weight as compared with prior art nacelles and can be simply manufactured.

Yet another object of the present invention is to provide a nacelle structure for wind turbines that has relatively low manufacturing costs and is easily scalable to be used for a wide range of wind turbines.

These objects are fulfilled by a nacelle structure for wind turbines as defined in claim 1, which structure is designed to house therein a transmission assembly which comprises a first shaft connected to a wind turbine rotor hub and to a gearbox, and a second shaft connected to the gearbox and to a generator; the structure comprises a substantially tubular outer metal shell defining a longitudinal axis and delimiting a space for housing the transmission assembly; a substantially vertical tubular extension with an upper end edge connected to said outer metal shell and a lower end edge secured to a tower; an inner metal frame secured to said outer metal shell and having a plurality of transverse ribs and a plurality of longitudinal ribs for joining said transverse ribs together.

Each transverse rib extends in a closed path, completely enclosing said transmission assembly, and said shell has at least one portion with a closed cross section, with at least one transverse rib secured thereto to generally and locally impart high torsional and flexural stiffness to said structure.

Furthermore, one or more transverse ribs are secured to the closed-section portion of the shell, which carry the supports of the transmission assembly such that the loads thereon can be transferred to the shell, in view of imparting high torsional and flexural stiffness to the structure, both generally and locally.

These characteristics will provide a very light-weight, resistant nacelle, that can evenly discharge bending and twisting loads along its structure thereby minimizing displacements of the supports of the transmission assembly in operation.

Furthermore, the provision of a metal shell makes the nacelle particularly suitable for use in wind power plants installed offshore or in places with very difficult environmental conditions.

Further objects, as better described hereinafter, are fulfilled by a nacelle structure for wind turbines as defined in the accompanying claims.

The features and advantages of the present invention will be clearly understood from the following detailed description of a preferred, non-limiting configuration of a nacelle structure for wind turbines, particularly referring to the following drawings.

The present invention relates to a nacelle structure for wind turbines that will be referenced 1 in the accompanying drawings.

Figure 1:
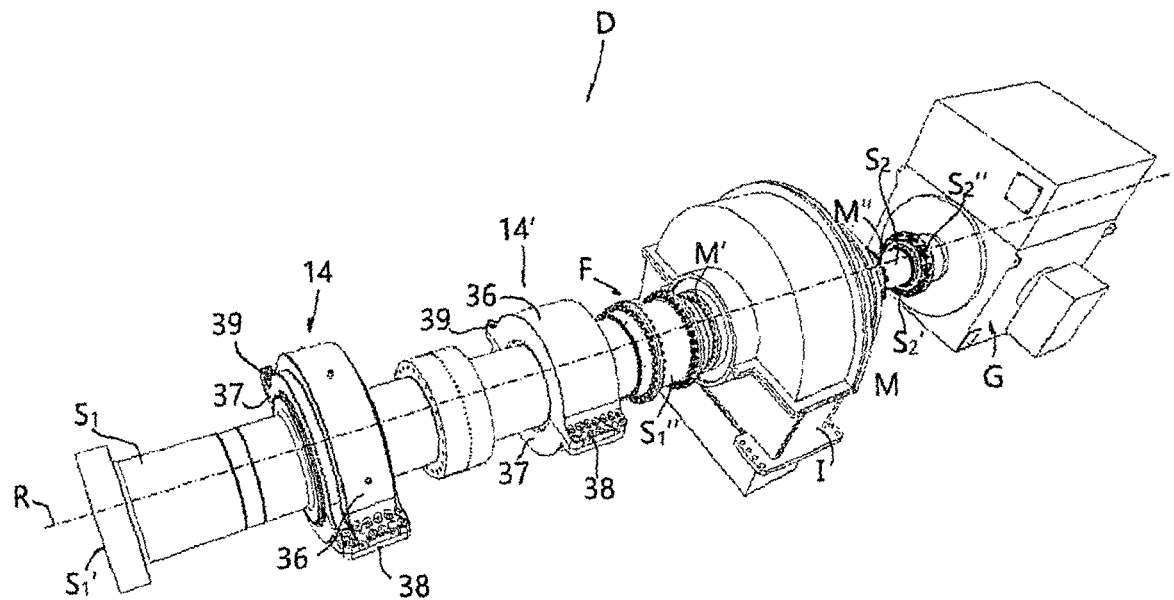
FIG. 1 is an isolated perspective view of a transmission assembly as used in indirect wind turbines, with the gearbox secured at the base.

In the preferred configuration, the wind turbine has a transmission assembly D, or drive train, as shown in FIG. 1, which is configured to directly drive a generator G via a gearbox secured to its base.

As best shown in FIG. 1, the transmission assembly D has a first shaft $S_1$ with a front end $S_1'$ adapted to be connected to a rotor hub, not shown, and a rear end $S_1''$ connected to the input M' of a gearbox M via a flexible coupling F.

The gearbox M also has an output M" connected to one end $S_2'$ of a second shaft $S_2$ which has the opposite end $S_2'$ directly connected to the electric generator G.

The shafts $S_1$, $S_2$ rotate about a common axis of rotation R and the position of the gearbox M and the generator G is substantially aligned with such axis R.

The present nacelle structure 1 is particularly suitable for use in large wind turbines which can generate electric power of the order of megawatts.

The self-supporting structure 1 comprises a substantially tubular outer metal shell 2 defining a longitudinal axis L and delimiting a space 3 for housing the transmission assembly D.

The longitudinal axis L may be substantially parallel to or coincident with the common axis of rotation R of the transmission assembly D.

Preferably, the longitudinal axis L will be substantially horizontal or slightly inclined to conform with the possible inclination of the transmission assembly D.

A tubular portion E is also provided, which is adapted to support the outer metal shell 2 and is directed downwards in a substantially vertical direction V.

Namely, the tubular portion E has an upper end edge B secured to the shell 2 and a lower end edge B' secured to a tower T that is fixed to a support surface.

An aperture or opening, not shown, is also formed on the shell 2 in the area delimited by the intersection of the shell with the upper end edge B of the tubular extension E.

Here, the tubular extension E may have an inner stiffening ring, not shown, which is located proximate to the upper end edge B'.

The length l of the tubular extension E changes according to the position of the yaw bearing, not shown.

Furthermore, an inner metal frame 4 is secured to the shell 2 and comprises a plurality of transverse ribs 6 and a plurality of longitudinal ribs 7.

The longitudinal ribs 7 are joined to the transverse ribs 6 via welding seams, thereby forming a one-piece inner frame 4.

Figure 6:
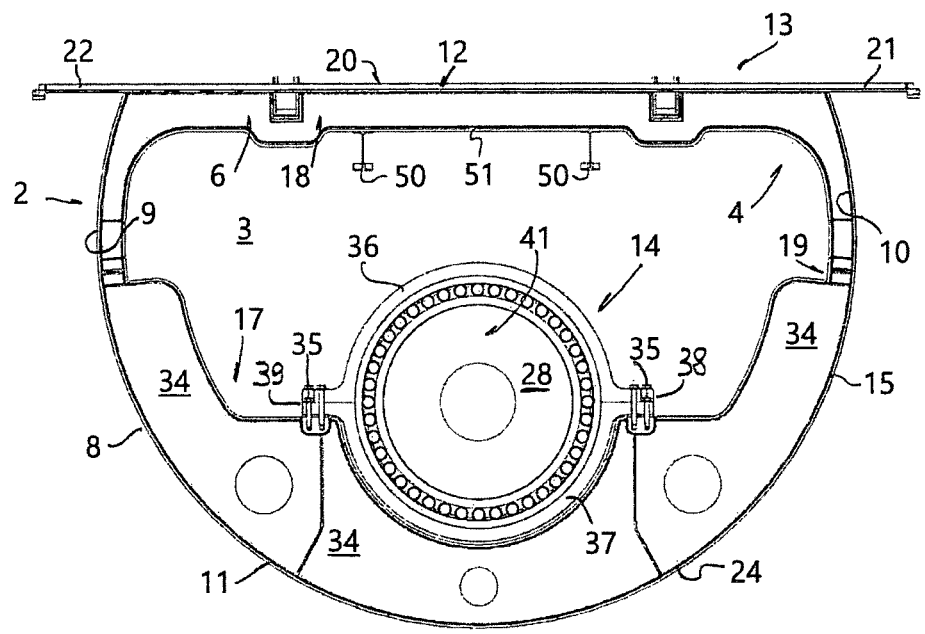
FIG. 6 is a cross section view of a second configuration of the nacelle structure of the invention in which the section plane is located at front bearing of the first shaft of the transmission assembly.
Figure 7:
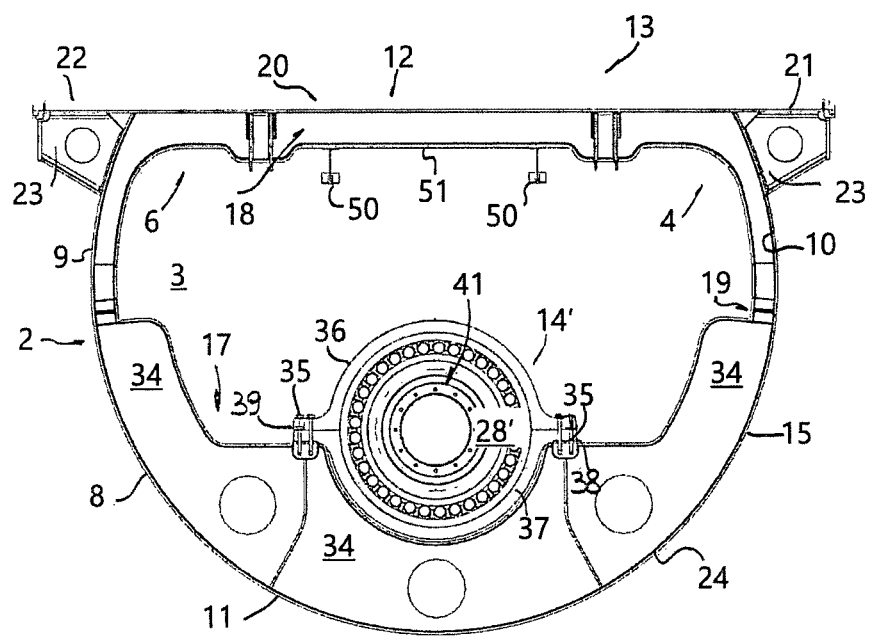
FIG. 7 is a broken-away view of the nacelle structure of FIG. 6 in which the section plane is located at the rear bearing of the first shaft of the transmission assembly.

As best shown in FIGS. 6 and 7, each transverse rib 6 extends in a closed path, completely enclosing the transmission assembly D.

Thus, the transmission assembly D will be entirely enclosed within the shell 2 and the plurality of transverse ribs 6.

Furthermore, the metal shell 2 has at least one closed cross section 8 secured to one or more transverse ribs 6, to thereby impart high torsional and flexural stiffness to the structure 1, both generally and locally.

The transverse ribs may have an outer edge 9 having substantially the same shape as the inner surface 10 of the shell 2. The latter may comprise a semicircular lower portion 11 and a planar upper portion 12, thereby forming a disk-shaped platform 13 for receiving a landing helicopter.

Also, as best seen in the figures, the transverse ribs 6 may have a circular or semicircular shape and may be longitudinally arranged to be located at the supports 14, 14' that carry the first shaft $S_1$ of the transmission assembly D.

Conversely, the longitudinal ribs 7 may be arranged along the circumferential extent of the transverse ribs 6.

As shown in FIGS. 6 and 7, at least at the supports 14, 14', the shell 2 has a closed cross section 8 which, in combination with the corresponding closed transverse ribs 6 connected thereto, can form a load-bearing structure 1 having high torsional and flexural stiffness.

In the nacelle structure as described above no support platform is used in the space 3 for supporting the transmission assembly D.

The latter will be directly secured to the inner frame 1 at the transverse ribs 6.

In the preferred embodiment of the invention, as shown in the figures, the shell 2 may be formed by a plurality of preformed metal sheets 15, joined together by full-penetration welding.

Each metal sheet 15 may have a thickness s ranging from 10 mm to 30 mm.

Furthermore, the outer edges 9 of the transverse ribs 6 and/or the outer edges 16 of the longitudinal ribs 7 are secured to the inner surface 8 of the shell 2 by welding.

As described above, the presence of one or more closed cross sections 8 of the shell 2, secured to corresponding transverse ribs 6, also extending in a closed path, can provide a structure 1 with a high structural strength.

With this configuration, the shell 2 is not a simple cover element but cooperates with the ribs 6, 7 to ensure a structural load-bearing function, allowing the structure 1 to support the transmission assembly D and impart general and local stiffness thereto, to minimize deformations.

As best described below, strong plates 17 may be formed on the transverse ribs 6, 7 for stably supporting the transmission assembly D.

By this arrangement, very strong nacelle structures 1 may be obtained, and the twisting and bending loads generated by the rotor or other causes, such as weights and external actions, will cause reduced stresses.

This will minimize the deformations of the structure 1 and the displacements of the parts of the transmission assembly D due to the applications of the various loads.

The transverse ribs 6 may have a T-section or, alternatively, a double T-shape, and the longitudinal ribs 7 may be formed with parts of beams having standard profiles.

As well shown in FIGS. 6 and 7, each closed transverse rib 6 may have a substantially straight upper section 18 and a substantially semicircular lower section 19.

The semicircular lower section 19 of the ribs 6 is joined to the lower portion 11 of the shell 2, whereas the straight upper section 18 thereof is joined to the planar upper portion 12 of the shell 2 that also defines the roof 20 of the structure.

Furthermore, two side wings 21, 22 are coupled to the roof 20 for completing the disk-shaped platform 13.

The side wings 21, 22 are coplanar with the roof 20 and are fixed in overhanging relationship to the shell 2.

As a result, these wings 21, 22 are supported by a plurality of support rods 23, or brackets, connected to the outer surface 24 of the lower portion 11 of the shell 3.

The wings 21, 22 may be also formed with a plurality of openings, not shown, which are closed by hinged covers, also not shown, and may be opened in case of adverse weather conditions to reduce the wind resistance of the disk-shaped platform 13.

Conveniently, the self-supporting structure 1 may be closed at its front and at its back by two flat walls 25, 26.

These walls 25, 26 may be made of metal or a different, non-metal material.

These flat walls 25, 26 assist in increasing the stiffness of the self-supporting structure 1 and may be connected to the shell 2 via peripheral flanges and bolts, not shown.

Figure 2:
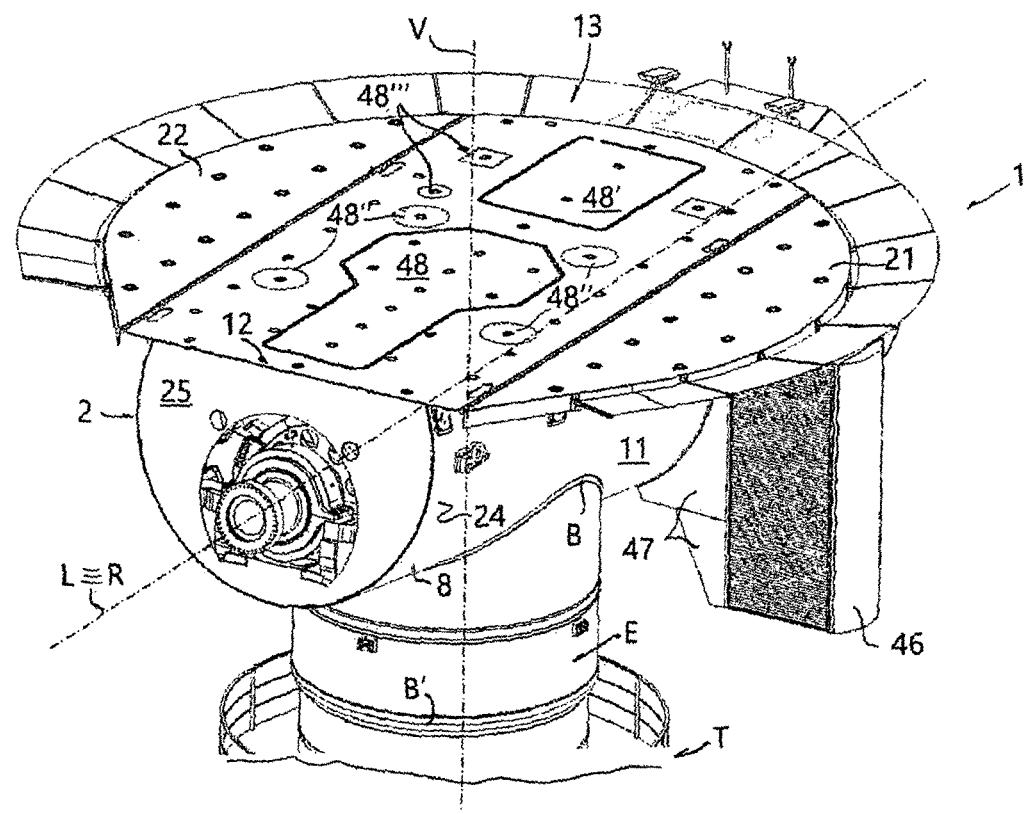
FIG. 2 and FIG. 3 are respective top and bottom perspective views of a nacelle structure for wind turbines in a first configuration.
Figure 3:
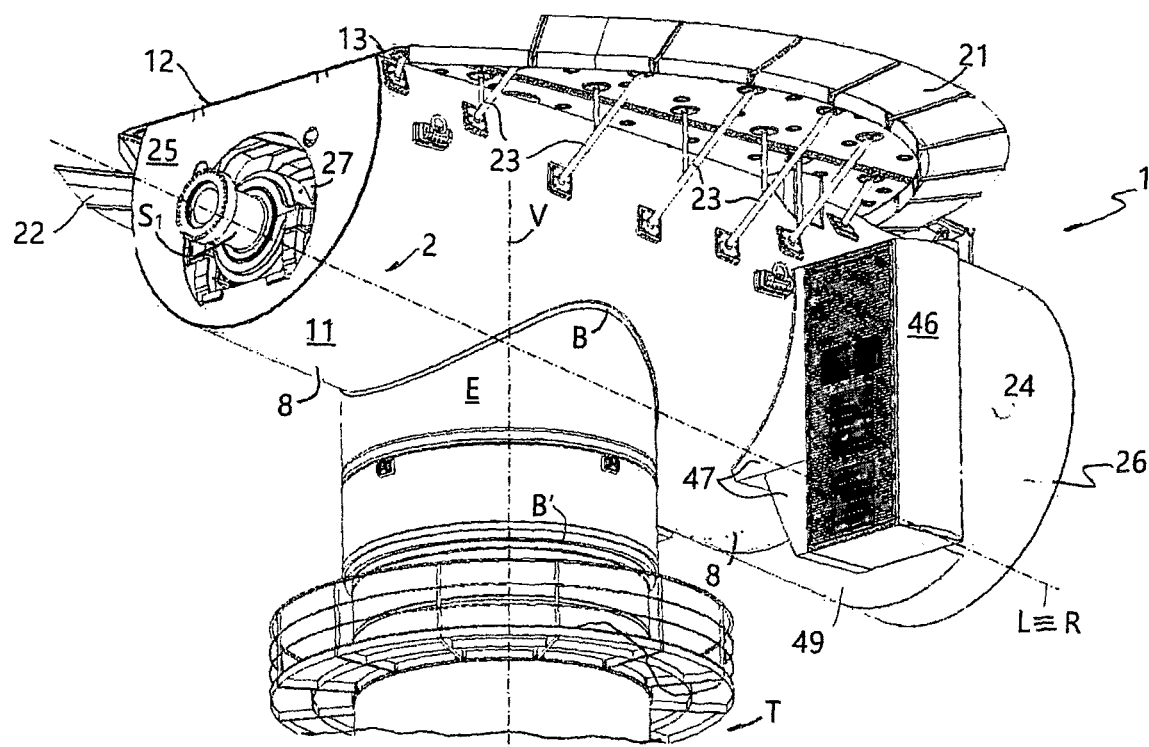

As shown in FIGS. 2-3, the font wall 25 has a central opening 27 for the passage of the first shaft $S_1$ of the transmission assembly D.

Furthermore, as shown in FIGS. 4-7, the inner frame 4 comprises plates 17 for supporting the transmission assembly D.

Namely, the plates 17 support at least one pair of supports 14, 14' for respective bearings 28, 28' mounted to the first shaft $S_1$ of the transmission assembly D.

In the configuration of the invention, as shown in FIGS. 1-5, each plate 17 comprises a pair of transverse arms 29, 30 connected to a respective transverse rib 6 and stiffened, in the longitudinal direction L, by appropriate connection elements 31 for connection to the longitudinal ribs 7.

Supports 14, 14' are bolted at the ends 32, 33 of respective arms 29, 30, for supporting a corresponding bearing 28, 28' of the shaft S1 of the transmission assembly D.

The pairs of arms 29, 30 are also mutually connected to the underlying transverse ribs 6 at the lower ends of the supports 14, 14'.

Otherwise, as best shown in FIGS. 6 and 7, the plates 17 may comprise radial reinforcements 34 which extend from the semicircular lower section 19 of the transverse ribs 6.

The supports 14, 14' of the bearings 28, 28' may be directly secured to the radial reinforcements 34 by means of suitable connecting screws 35.

Figure 4:
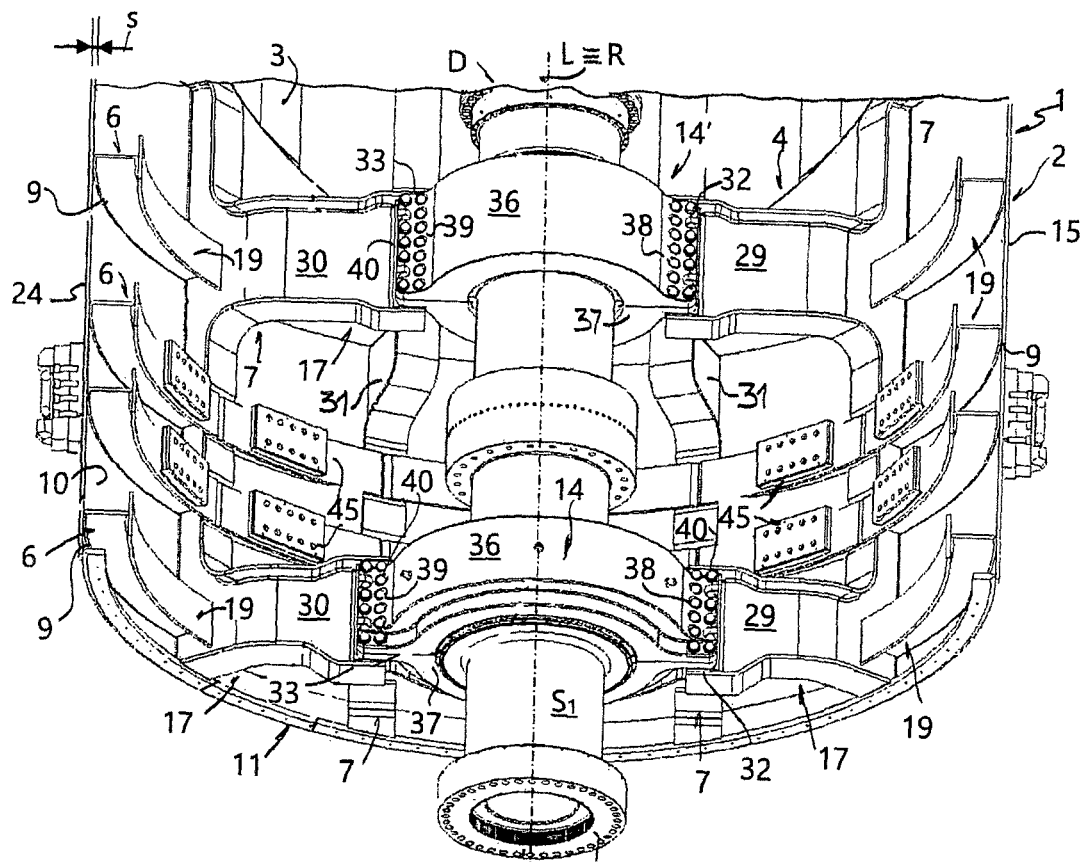
FIG. 4 and FIG. 5 are first and second partially cross section views of the structure of FIGS. 2 and 3.
Figure 5:
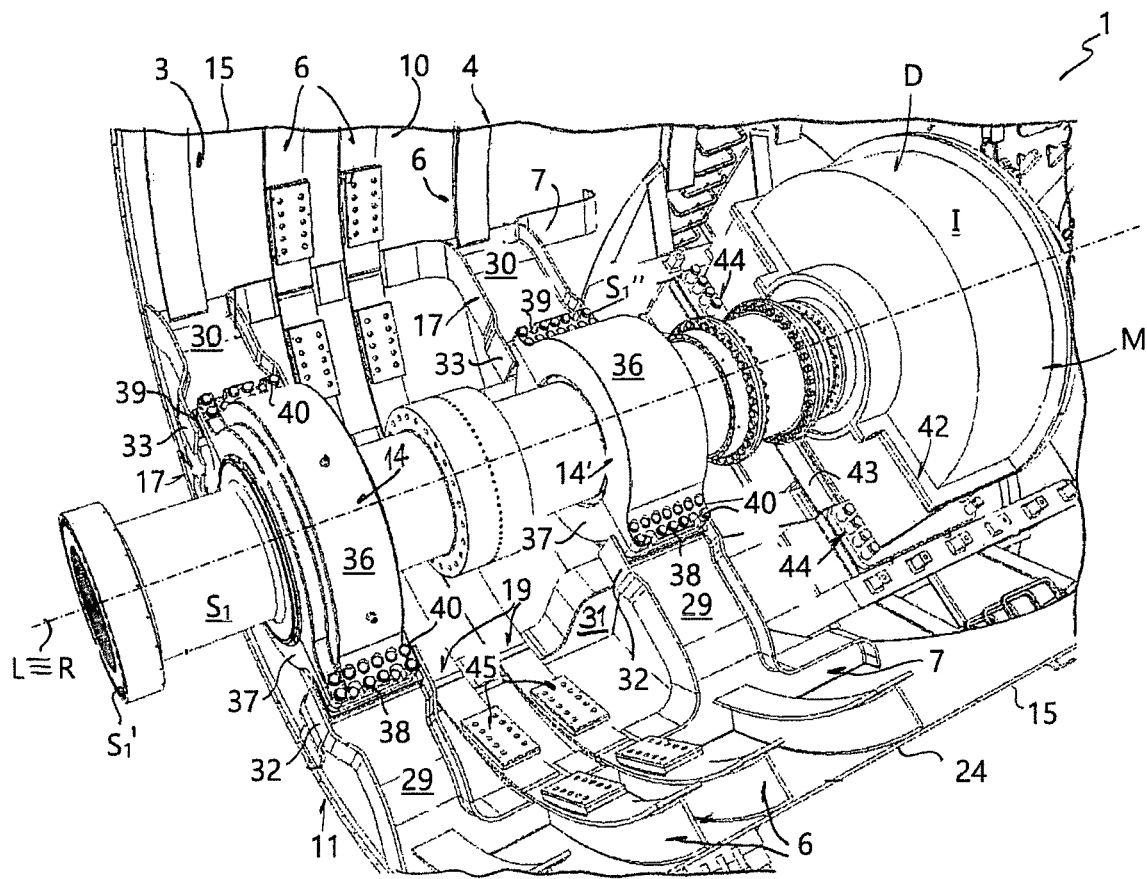

Preferably, as shown in FIGS. 4-5, each support 14, 14' may comprise two mutually coupled half-shells 36, 37, having radial extensions 38, 39 attached to the free ends 32, 33 of the arms 29, 30 by means of anchor bolts 40 or attached to the radial reinforcements 34 by means of the connecting screws 35.

The half-shells 36, 37 delimit a cavity 41 which may receive a respective bearing 28, 28' mounted to the first shaft $S_1$.

The shafts $S_1$, $S_2$ and the coupling of the transmission assembly D may be aligned with the bearings 28, 28' by interposing special adjustment shims, not shown, between the supports 14, 14' and the arms 29, 30 or the radial reinforcements 34.

The inner frame 4 may have a support structure 42 for supporting the gearbox M, as best shown in FIG. 5.

This support structure 42 may be designed to be structurally seamless with the ribs 6, 7 and the shell 2.

The structure 42 may be located at the opening or aperture formed on the shell 3 within the area delimited by the intersection between the outer surface 24 thereof and the upper edge B of the tubular extension E.

Furthermore, this support structure 42 may consist of a plurality of cross members 43, one of which is shown in FIG. 5, for the case I of the gearbox M to be secured thereto via connection means 44, generally of screw or stud type, or the like.

The transmission assembly D may also comprise braking means, not shown, selectively acting upon the first shaft $S_1$ to reduce the rotation speed of the rotor or lock it once it has stopped.

These braking means may be in turn secured to the inner frame B via appropriate support members, generally referenced 45.

Preferably, the structure 1 may comprise at least one compartment 46 adapted to accommodate cooling means H for cooling the generator G and the gearbox M.

The compartment 46 may be secured to the outer surface 24 of the shell 2 via appropriate connection elements 47. Particularly, as best shown in FIGS. 2-3, the connecting elements 47 may be secured to the lower portion 11 of the shell 2.

Advantageously, a plurality of reclosable openings 48, 48', 48", 48''' may be formed at the roof 20 of the shell 2.

Particularly, as best shown in FIG. 2, a first opening 48 may be formed on the roof 20 of the structure 1 and is appropriately shaped to allow the first shaft $S_1$ and the gearbox M to be fitted into the space 3 during assembly. The opening may be closed using appropriate mechanical connections, allowing a seamless structure of the roof 12 to be restored.

Furthermore, the roof 12 may also have a second reclosable opening 48', which is also shaped to allow the generator G to be fitted in the space 3 during assembly. The opening may be also closed using mechanical connections, allowing a seamless structure of the roof 12 to be restored.

Also, the shell 2 may be formed with small reclosable openings 48" for replacement of the small parts of the transmission assembly D, during maintenance, and with manholes 48''' for access to the structure 1 from the roof 12 by maintenance operators.

The structure 1 may also have a downwardly directed reclosable passage 49, as shown in FIG. 3, located proximate to the rear wall 26 for use during extraordinary maintenance in case of replacement of parts of the transmission assembly D, e.g. the generator G. Here, appropriate lifting means, not shown, located on the roof 12, may be used to vertically move the parts to be replaced out of or into the space 3 through the passage 49.

Furthermore, two strong longitudinal guides 50, as shown in FIGS. 6 and 7, may be secured within the roof 12, for slidingly supporting a bridge crane, not shown, for use in the maintenance of the transmission assembly.

Namely, the longitudinal guides 50 may be secured to the inner surface 51 of the straight upper section 18 of the closed transverse ribs 6.

The present invention may be implemented in other variants, falling within the scope of the inventive technical features as claimed and described; these technical features may be replaced by other technically equivalent elements, and any material, as well as any shape and size, may be used in the invention, provided that they are compatible with its use.

The reference numerals and signs in the claims and description are only intended to improve the clarity of the text and shall not be deemed to be elements that limit the technical interpretation of the objects or processes identified therewith.

The invention claimed is:

1. A self-supporting nacelle structure (1) for wind turbines adapted to house a transmission assembly (D) therein, the transmission assembly (D) comprising a first shaft ($S_1$) connected to a wind turbine rotor hub and to a gearbox (M), and a second shaft ($S_2$) connected to the gearbox (M) and to a generator (G), the nacelle structure (1) comprising:
   a substantially tubular outer metal shell (2) defining a longitudinal axis (L) and delimiting a space (3) for housing the transmission assembly (D);
   a substantially vertical tubular extension (E) with an upper end edge (B) connected to said outer metal shell (2) and a lower end edge (B') secured to a tower (T); and
   an inner metal frame (4) anchored to said outer metal shell (2) and having a plurality of transverse ribs (6) and a plurality of longitudinal ribs (7) adapted to join said transverse ribs (6) together,
   wherein each of said transverse ribs (6) extends in a closed path, completely enclosing the transmission assembly (D),
   wherein said outer metal shell (2) has at least one portion (8) with a closed cross section with at least one of said transverse ribs anchored thereto to generally and locally impart high torsional and flexural stiffness to said nacelle structure (1), other ones of said transverse ribs being disposed in longitudinally spaced positions from said closed cross section,
   wherein said transverse ribs (6) have an outer closed edge (9) having substantially a same shape as an inner surface (10) of said outer metal shell (2),
   wherein said transverse ribs (6) and/or said longitudinal ribs (7) are joined to said outer metal shell (2) at the inner surface (10) thereof, thereby supporting the transmission assembly (D) with a predetermined structural stiffness designed to minimize deformations of said inner frame (4),
   wherein said outer metal shell (2) has a semicircular lower portion (11) and a planar upper portion (12) designed to define a roof (20) so as to define a disk-shaped platform (13) for receiving a landing helicopter, and
   wherein each of said transverse ribs (6) has a substantially semicircular lower section (19), which is joined to said semicircular lower portion (11) of said outer metal shell (2), and a substantially straight upper section (18), which is joined to said planar upper portion (12) of said outer metal shell (2).

2. The self-supporting nacelle structure as claimed in claim 1, further comprising at least one pair of supports (14, 14') for respective bearings (28, 28') mounted onto the first shaft ($S_1$) of the transmission assembly (D), each support (14, 14') of said pair being anchored to a respective transverse rib (6).

3. The self-supporting nacelle structure as claimed in claim 2, wherein each support (14, 14') comprises a pair of half-shells (36, 37), which delimit a cavity (41) for housing a respective bearing (28, 28') therein.

4. The self-supporting nacelle structure as claimed in claim 3, wherein the substantially semicircular lower section (19) of the respective transverse rib (6) has an inwardly extending radial reinforcement (34), one of the half-shells (37) of one of the supports (14, 14') being fixed to the radial reinforcement (34), another one of the half-shells (36) of the one of the supports (14, 14') being separated from the straight upper section (18) by an open space.

5. The self-supporting nacelle structure as claimed in claim 2, wherein said supports (14, 14') are anchored to said inner metal frame (4) via pairs of transverse arms (29, 30) that extend in a substantially radial direction from respective transverse ribs (6).

6. The self-supporting nacelle structure as claimed in claim 2, wherein said supports (14, 14') are secured to said inner frame (4) via radial reinforcements (34) that extend from a semicircular lower section (19) of a corresponding transverse rib (6).

7. The self-supporting nacelle structure as claimed in claim 1, wherein said outer metal shell (2) is made of a plurality of appropriately shaped metal sheets (15), joined to one another.

8. The self-supporting nacelle structure as claimed in claim 1, wherein the transverse ribs (6) have a T-shape defined by a radial member having one end contacting the outer metal shell and another end contacting a cross-member perpendicular to the radial member.

9. The self-supporting nacelle structure as claimed in claim 1, further comprising a pair of side wings (21, 22) connected to said roof (20) to form said disk-shaped platform (13) for receiving said landing helicopter, said side wings (21, 22) being also anchored to said outer metal shell (2) via a plurality of support rods (23).

10. The self-supporting nacelle structure as claimed in claim 1, further comprising at least one compartment (46) external to said outer metal shell (2) and adapted to house a cooling system (H) of the generator (G) and the gearbox (M), a connection system (47) being provided that anchors said at least one compartment (46) to an outer surface (24) of said outer metal shell (2).

11. The self-supporting nacelle structure as claimed in claim 10, further comprising a plurality of reclosable openings (48, 48', 48'', 48''') on said roof (20) of said outer metal shell (2) to enable assembly of the transmission assembly (D) during assembly operations, and/or for access to said space (3) and to the at least one compartment during maintenance operations.

12. The self-supporting nacelle structure as claimed in claim 1, wherein said outer metal shell (2) has a downwardly directed passage (49) to enable replacement of parts of the transmission assembly (D) using a lifting device located on said roof (20) of said outer metal shell (2).

* * * * *